R. M. LINDSAY.
MEASURING APPARATUS.
APPLICATION FILED MAY 31, 1912.
1,052,492.
Patented Feb. 11, 1913.
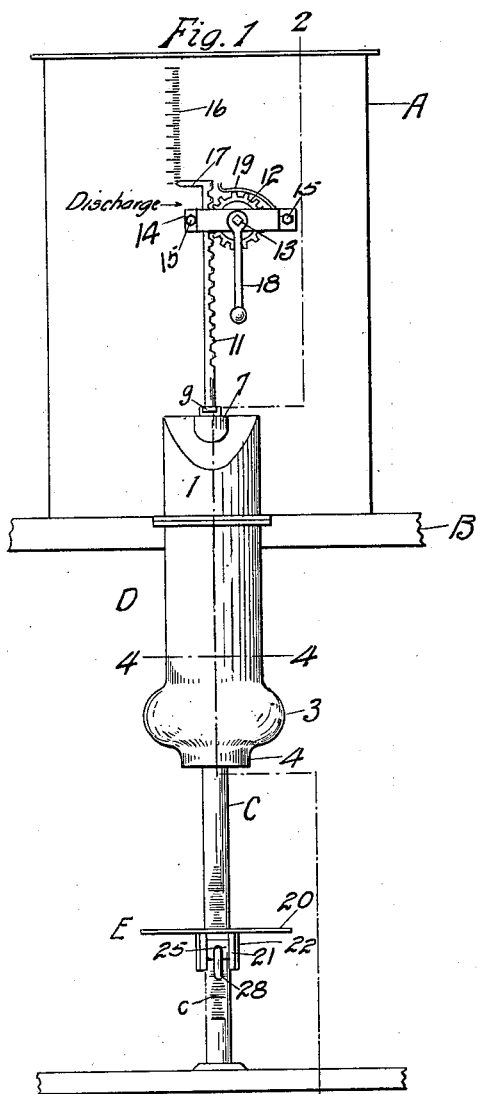
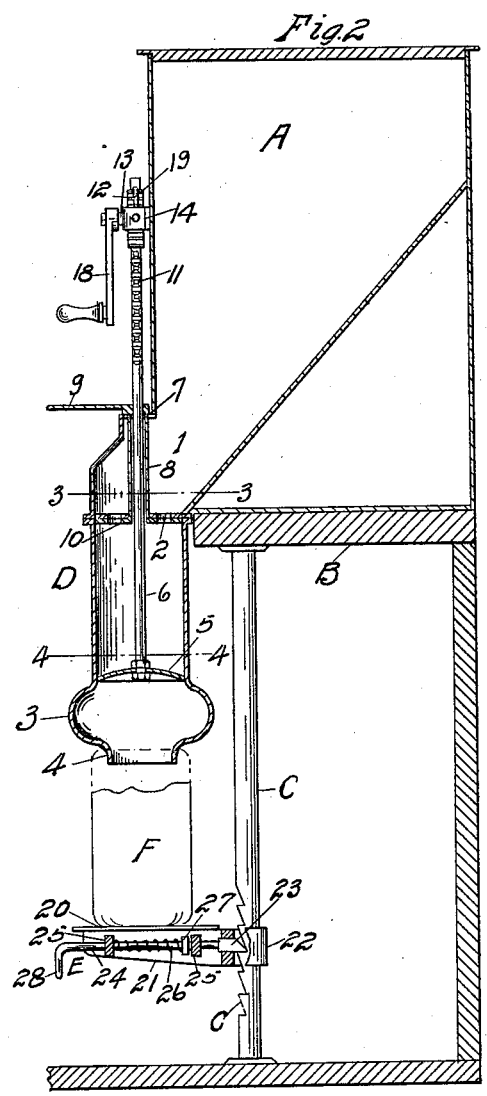
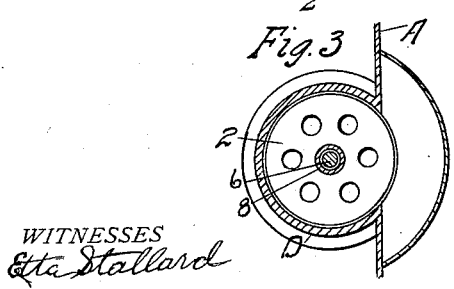
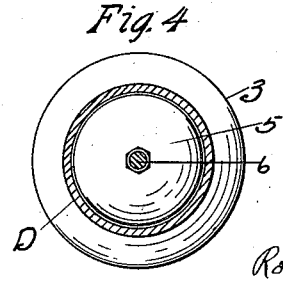
WITNESSES
INVENTOR
Robert M. Lindsay
By Cyrus Kehr
Attorney

UNITED STATES PATENT OFFICE.

ROBERT M. LINDSAY, OF LENOIR CITY, TENNESSEE.

MEASURING APPARATUS.

1,052,492.  Specification of Letters Patent.  Patented Feb. 11, 1913.

Application filed May 31, 1912. Serial No. 700,722.

*To all whom it may concern:*

Be it known that I, ROBERT M. LINDSAY, a citizen of the United States, residing at Lenoir City, in the county of Loudon and State of Tennessee, have invented a new and useful Improvement in Measuring Apparatus, of which the following is a specification, reference being had to the accompanying drawing.

My improvement relates particularly to apparatus for measuring mobile commodities—commodities capable of flowing to fill a compartment.

The object of the invention is to provide such an apparatus in which there is a compartment which may be varied in size to adapt it to contain various chosen quantities of the commodities to be measured.

My apparatus may comprise also a larger compartment or reservoir from which portions of the contents are drawn into said adjustable compartment. In that form, my improved apparatus is a dispensing apparatus.

In the accompanying drawings, Figure 1 is a front elevation of an apparatus embodying my improvement; Fig. 2 is a sectional elevation on the line, 2—2, of Fig. 1; Fig. 3 is a horizontal section on the line, 3—3, of Fig. 2; Fig. 4 is a section on the line, 4—4, of Figs. 1 and 2.

Referring to said drawings, A is a bin or reservoir. This is mounted on a support, B, comprising a column, C. The bin or reservoir extends forward of the support, B, and has at its lower portion a neck, 1, to which is secured the upper or receiving end of an upright, tubular measuring body, D, said upper end having a receiving opening. At the junction of said body and said neck there is a horizontal, perforated partition, 2. At the lower or discharge end of the body, D, is an expanded portion, 3, and then a contracted portion, 4, having a discharge opening. The diameter of the latter is adapted to the size of vessels into which the contents of said body are to be discharged. Hence said portion, 4, may be varied in diameter. The main portion of said body, the portion between the receiving opening and the point at which the discharge is to take place, is substantially uniform in cross section, and within the body, D, is a shiftable head, partition, or piston, 5, of suitable diameter to closely fit the portion of the body, D, above the portion, 3. Discharge takes place when the piston moves out of the uniform portion of the body into the expanded portion, 3. The piston, 5, is supported by a stem, 6, which extends upward through the perforated partition, 2, and through an off-set portion, 7, of the front wall of the reservoir, A. A tube, 8, loosely surrounds the stem, 6, between the partition, 2, and the off-set wall portion, 7, and extends upward through said wall and there rigidly supports a handle, 9, and extends downward loosely through said partition and there rigidly supports a circular cut-off plate, 10, having openings adapted to register with the openings in the partition, 2. By turning said handle, the tube, 8, and the plate, 10, are rotated to bring the openings of said plate into and out of registry with the holes in the partition, 2. The right hand side of the upper portion of the stem, 6, has a gear rack, 11, which registers with a spur gear wheel, 12, which is mounted on a shaft, 13, having bearings in a bracket, 14, secured to the front wall of the reservoir, A, by means of bolts or rivets, 15, said bracket extending around the stem, 6, and forming a guide for holding the rack, 11, in engagement with the gear wheel, 12. Adjacent the upper end of the rack is an upright scale, 16, and on the rack is a finger or pointer, 17, reaching to said scale. On the shaft, 13, is a crank, 18. By turning said crank clock-wise, as viewed in Fig. 1, the rack, 11, stem, 6, the piston, 5, and the pointer, 17, are moved upward, and by turning said crank in the reverse direction, said parts are moved downward. The piston, 5, may bear against the inner face of the wall of the body, D, sufficiently to keep said piston, stem, and rack, from descending by gravity. For the same purpose, the stem, 6, may fit closely in the tube, 8; and for the same purpose a spring, 19, mounted on the bracket, 14, bears upon the teeth of the spur gear wheel, 12.

A platform, 20, is mounted beneath the body, D, and there supported by an arm, 21, extending beneath said platform and having a hub, 22, extending closely around the column, C, so that said arm slides up and down on said column. In said column are notches, *c*, and on the arm, 21, is a latch, 23, adapted to enter the notches, *c*. Said latch is supported by a rod, 24, slidable lengthwise in bearings, 25, supported by the arm, 21. An expanding coiled spring, 26, surrounds the bar, 24, between the outer bearing, 25, and a collar, 27, fixed on said bar between the two bearings, 25, and 26. Said spring constantly tends to push said bar and said latch toward the column, C. Hence said latch forms an automatic means for engaging the column, C, and said latch is supported by the arm, 21, upon which rests the platform, 20. The platform, 20, arm, 21, and hub, 22, are secured rigidly to each other and may be integral. For the purposes of operation, these parts may be regarded as being a single member which is a support for receptacles, F, which are to receive material from the body, D. At its outer end, the bar, 24, has a finger piece, 28, to be engaged for drawing the bar forward when the latch, 23, is to be disengaged. Said finger piece is so located as that one hand may draw said finger piece and at the same time engage the supporting member for raising the latter or for lowering it under control until the said finger piece is again released and the latch be driven forward into engagement with the column, C, by the action of the spring, 26.

The compartment formed within the measure body, D, between the cut-off plate, 10, and the piston, 5, may be varied by raising and lowering the piston above the portion, 3, of said body. The scale, 16, is so located and divided as to indicate different capacities or volumes between said cut-off plate and said piston, the highest marking on the scale indicating the position to which the piston is to be set. At the lower portion of the scale is a point marked "Discharge," which point indicates when the piston is moved downward into the enlarged portion, 3, of the body, D, said portion being large enough to make room around the piston for the downward flow of material from the main portion of the body, D. The plates, 2 and 10, constitute a valve for controlling the movement of material into the body, D.

In practice, a receptacle, usually a bag, is placed upon the receptacle support, E, in position to receive material flowing from the lower or mouth portion of the body, D. In practice, the handle, 9, is turned to turn the cut-off plate, 10, to bring the openings out of register with the openings of the partition, 2, whereby communication between the compartment, A, and the body, D, is cut off. Now the commodity or material is placed into the reservoir or bin, A, to be withdrawn, from time to time, through the body, D.

When material is to be withdrawn from the reservoir, the crank, 18, is turned to bring the point, 17, to the portion of the scale, 16 which indicates the quantity or volume of material to be withdrawn from the reservoir. Then the handle, 9, is turned so as to turn the cut-off plate, 10, to bring the openings of the latter into registry with the openings of the partition, 2. Then the material or the commodity in the reservoir flows downward through said partition and said cut-off plate until all of the space within the body, D, and between the cut-off plate and the piston is filled with said material. Then the handle, 9, is turned to turn the cut-off plate sufficiently to bring the openings of said plate and the partition, 2, out of registry so that the flow of the material from the reservoir into the body, D, is again cut off. Then the crank, 18, is reversed to lower the rack, 11, until the pointer, 17, stands at or near the point designated, "Discharge." This brings the piston, 5, into the expanded portion, 3, of the body, D. This is the discharge position of said piston. As soon as the piston enters said enlarged portion, the material supported by said piston within the body, D, flows downward of the periphery of the piston and downward through the portion, 4, of the body, D, into the receptacle, F. When the flow of the material has ceased, the bag may be removed, the apparatus being left at rest until another receptacle is to be filled. If the quantity is to be the same as has been put into the first bag, the operation is continued by turning the crank to again raise the pointer to the same height as before. Then the handle, 9, is again turned to turn the cut-off plate, 10, for flow from the receptacle, A, downward into the body, D. When the space within said body and above the piston has been filled, said handle is again turned for cutting off such flow. Then the piston is again lowered for discharge. Thus the operation is repeated indefinitely. If a different quantity is to be taken, the crank is turned for setting the pointer, 17, accordingly. If a receptacle is to receive any multiple of a given volume within the capacity of the body, D, the filling and discharging of the body, D, is repeated accordingly before removing the receptacle.

The body, D, may be made of glass, in order that the movement of the piston and the material therein may be observed. For receptacles, F, of different heights, the support, E, may be varied.

I claim as my invention:

1. In an apparatus of the nature described, the combination of a hollow measure body having a receiving opening and a discharging opening and being substantially uniform in cross-section between said openings, a piston within said body, said piston and said body being relatively movable to bring the piston below and into position within the uniform portion of said body, and a valve located at said receiving opening and movable independently of said piston, substantially as described.

2. In an apparatus of the nature described, the combination of a hollow measure body having a receiving opening and a discharge opening and being substantially uniform in cross-section between said openings, a piston within said body, said piston and said body being relatively movable, means for relatively moving said body and said piston to bring the piston below and into different positions within the uniform portions of said body, and means movable independently of said piston for controlling said receiving opening, substantially as described.

3. In an apparatus of the nature described, the combination of a hollow measure body having a receiving opening and a discharge opening, a piston movable within said body toward and from the receiving opening and controlling the discharge opening, means for moving said piston into different positions within said body, and means for indicating the positions of said piston, substantially as described.

4. In an apparatus of the nature described, the combination of a hollow measure body having a receiving opening and a discharge opening and being substantially uniform in cross-section between said openings, a piston movable within said body toward and from the receiving opening for controlling the discharge opening, means for moving said piston below and into different positions within the uniform portion of said body, and a cut-off valve movable transversely to said body for controlling said receiving opening, substantially as described.

5. In an apparatus of the nature described, the combination of a hollow measure body having a receiving opening and a discharge opening, means for controlling said receiving opening, a piston movable within said body toward and from the receiving opening and controlling the discharge opening, means for moving said piston into different positions within said body, and means for indicating the positions of said piston, substantially as described.

6. In an apparatus of the nature described, the combination of a hollow measure body having a receiving opening and a discharge opening and being substantially uniform in cross-section between said openings, a cut-off valve movable transversely to said body for controlling said receiving opening, a piston within said body, a piston stem extending through said cut-off valve, and means for shifting said stem endwise to bring said piston below and into different positions within said uniform portion, substantially as described.

7. In an apparatus of the nature described, the combination of a hollow measure body having a receiving opening and a discharge opening, valve mechanism for controlling said receiving opening, a piston within said body, a piston stem extending through said valve mechanism, means for shifting said stem endwise to bring said piston into different positions, and means for indicating the positions of said piston, substantially as described.

8. In an apparatus of the nature described, the combination of a hollow measure body having a receiving opening and having an open enlarged portion and being of substantially uniform cross section above said enlarged portion, a piston movable within said body toward and from the receiving opening and into said enlarged portion, and means for moving said piston below and into different positions within the uniform portion of said body, substantially as described.

9. In an apparatus of the nature described, the combination of a hollow measure body having a receiving opening and having an enlarged portion with a discharge opening, a piston movable within said body toward and from the receiving opening and controlling the discharge opening, means for moving said piston into different positions within said body, and means for indicating the positions of said piston, substantially as described.

In testimony whereof I have signed my name, in presence of two witnesses, this twenty-seventh day of May, in the year, one thousand nine hundred and twelve.

ROBERT M. LINDSAY.

Witnesses:
S. P. STITT,
R. B. WITT.